United States Patent
Jacquemin

[11] Patent Number: 6,079,685
[45] Date of Patent: Jun. 27, 2000

[54] SMALL BRACKET FOR SUN VISORS OF VEHICLES

[75] Inventor: Didier Jacquemin, Luxeuil les Bains, France

[73] Assignee: Becker Group Europe GmbH, Wuppertal, Germany

[21] Appl. No.: 09/071,227

[22] Filed: May 1, 1998

[30] Foreign Application Priority Data

May 2, 1997 [DE] Germany .......................... 197 18 693

[51] Int. Cl.$^7$ .................................... F16B 45/00
[52] U.S. Cl. .................. 248/304; 248/74.2; 248/289.11; 296/97.13
[58] Field of Search ............................ 248/289.11, 74.2, 248/304; 296/97.13, 97.9

[56] References Cited

U.S. PATENT DOCUMENTS

| | | | |
|---|---|---|---|
| 4,729,590 | 3/1988 | Adams | 296/97 |
| 5,468,041 | 11/1995 | Viertel et al. | |
| 5,560,669 | 10/1996 | Gute | 296/97.9 |
| 5,618,015 | 4/1997 | Morini | 248/74.2 |
| 5,711,571 | 1/1998 | Renahy et al. | 296/97.13 |
| 5,829,817 | 11/1998 | Ge | 298/97.9 |
| 5,967,589 | 10/1999 | Spadafora | 296/97.9 |

FOREIGN PATENT DOCUMENTS

| | | |
|---|---|---|
| 43 26 660 | 2/1995 | Germany . |
| 44 42 133 C1 | 3/1996 | Germany . |

*Primary Examiner*—Ramon O. Ramirez
*Assistant Examiner*—Walter Landry
*Attorney, Agent, or Firm*—Harness, Dickey & Pierce, P.L.C.

[57] ABSTRACT

A small bracket for sun visors of vehicles, having two arms extending around a sun visor shaft in a clamp-like manner, the sides of the arms facing each other constituting an undercut seating opening for the sun visor shaft and an insertion slit, which makes the repeated insertion of the latter into the bearing opening possible, wherein the first arm is embodied on a base body and the second arm on a complementary body connected with it via a film hinge, and that a spring is located between the base body and the complementary body, which together constitute the small bracket.

8 Claims, 2 Drawing Sheets

SMALL BRACKET FOR SUN VISORS OF VEHICLES

FIELD OF THE INVENTION

The invention relates to a small bracket for sun visors of vehicles, having two arms extending around a sun visor shaft in a clamp-like manner, the sides of the arms facing each other constituting an undercut seating opening for the sun visor shaft and an insertion slit, which makes the repeated insertion of the latter into the bearing opening possible, wherein the first arm is embodied on a base body and the second arm on a complementary body connected with it via a film hinge, and that a spring is located between the base body and the complementary body, which together constitute the small bracket.

BACKGROUND OF THE INVENTION

A small bracket of this type is described in German Letters Patent 44 42 133 of the instant Applicant. In this small bracket, the base body has a plug opening for the complementary body, wherein a vertically placed pin extends from the bottom of the plug opening, which is provided with a bore, which also leads through the base body. The complementary body is designed with a tube-shaped projection extending over the pin and supported on the bottom of the plug opening, so that a screw, which extends through the bore of the base body, can be screwed in as a fastening element, by means of which the fastening of the complementary body on the base body as well as the fastening of the small bracket on the vehicle body takes place. The spring, which is embodied as a helical compression spring, is arranged between the pin and the tube-shaped projection, whose one end is supported on a stop in the interior of the tube-shaped projection and the other end on the head of the screw. The base body is designed as a one-piece plastic injection-molded element together with the complementary body, with a tongue as the connecting member and a film hinge in the tongue as the folding joint. The problem-free snapping in and out of the sun visor shaft, both at particularly low temperatures and particularly high temperatures is achieved by means of the spring system, wherein an always even holding force independent of the temperature is assured, and in addition a compensation of production tolerances is made possible.

Although this small bracket has proven itself outstandingly in actual use, a requirement for improvement exists in particular in respect to a simplification of the manufacture and assembly.

OBJECT AND SUMMARY OF THE INVENTION

It is therefore the object of the instant invention to improve a small bracket of the type mentioned at the outset in such a way that manufacture and the mounting on a vehicle body are simplified.

Based on this object it is proposed by the invention in connection with a small bracket of the type mentioned at the outset that the base body has an opening for the complementary body, that the complementary body is designed with a projection which enters into a clearance of an extension on the base body and is supported by means of a hook arrangement, that the extension has spreading arms for fixing the small bracket in place in an opening of the vehicle body, which arms are also used for fixing the complementary body on the base body, wherein the spring, which is designed as a spring, is arranged between the base body and the complementary body in the area between the film hinge and the projection, and one leg of which is supported on the base body and the other leg on the complementary body.

The helical compression spring provided for the small bracket in accordance with German Letters Patent 44 42 133 has been replaced in accordance with the instant invention by a simple spring. The screw which is required for the small bracket in accordance with this German Letters Patent for fixing the complementary body in place on the base body as well as fixing the small bracket in place on the vehicle body may be omitted, because the base body and the complementary body are connected with each other by means of hooking, and the spreading arms on the extension are used for fixing the small bracket in place in an opening of the vehicle body, where the arms spread behind the opening of the vehicle body and cause the extension to snap into the body opening.

The manufacture of the small bracket is considerably simplified in this manner and it can be mounted on a vehicle body without aids and tools.

The spreading leg preferably can have a shoulder for gripping behind an edge of a body sheet metal piece and, starting at the shoulder, a narrower extension with a transverse strip, wherein two hooks at the projection extend below the transverse strip on both sides of the extension.

In order to provide the projection with sufficient elasticity for mounting and fastening, the projection preferably can consist of three parallel legs, the center one of which being embodied without a hook.

A particularly advantageous support, which is effective at all temperatures and provides a tolerance compensation is achieved, if the spring has been fastened with one leg in a slit of the base body and the other leg has been bent twice in such a way that it terminates in the area of the clearance.

The invention will be explained in more detail below by means of several exemplary embodiments represented in the drawings.

BRIEF DESCRIPTION OF THE DRAWINGS

FIG. 2 is a cross-sectional plan view of the small bracket in accordance with the invention in FIG. 1 in the mounted state with the bearing shaft snapped in.

DETAILED DESCRIPTION OF THE PREFERRED EMBODIMENTS

Figure 1:
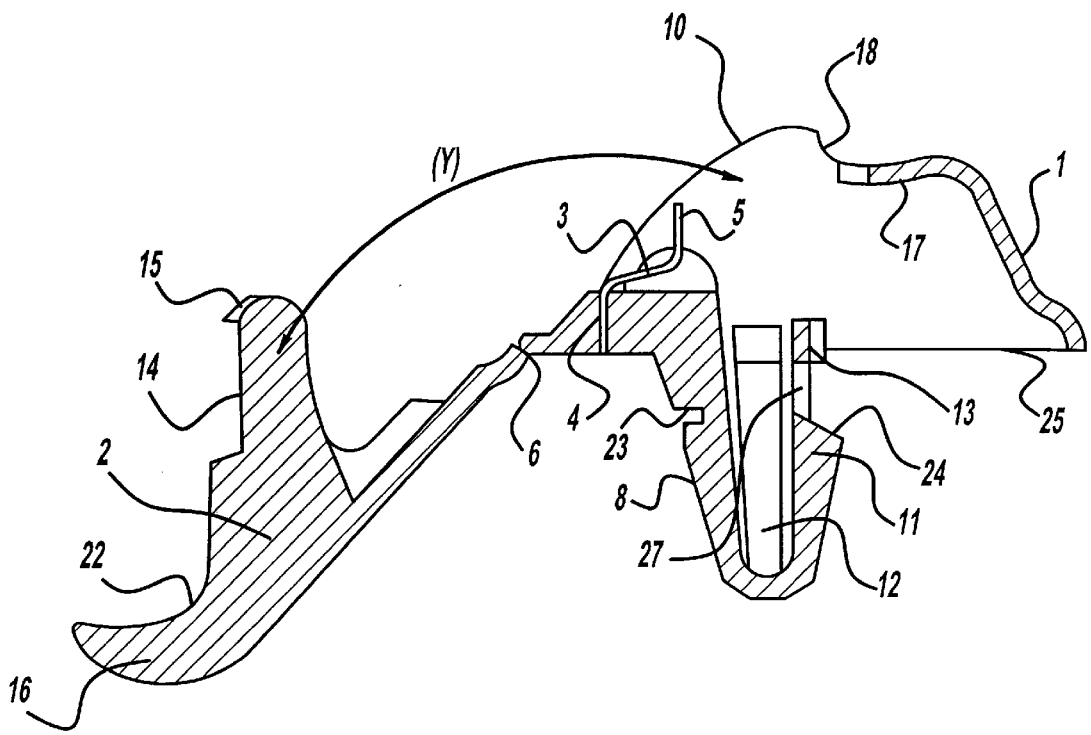
FIG. 1 is a cross-sectional plan view of the small bracket in accordance with the invention prior to assembly and mounting in a body opening in accordance with a first embodiment.

The small bracket consists of a base body 1, a complementary body 2 embodied as a one-piece plastic part with it, and a spring 3. A constriction in the material which crosses the connecting area between the base body 1 and the complementary body 2 constitutes a film hinge 6 as a folding joint, by means of which it is possible to flip the complementary body 2 out of its initial position represented in FIG. 1 into its position of use in accordance with FIGS. 2 and 3.

One leg of a spring 3, whose upwardly extending leg 5 provides the support on the complementary body 2, has been inserted into a slit in the base body 1.

Figure 2:
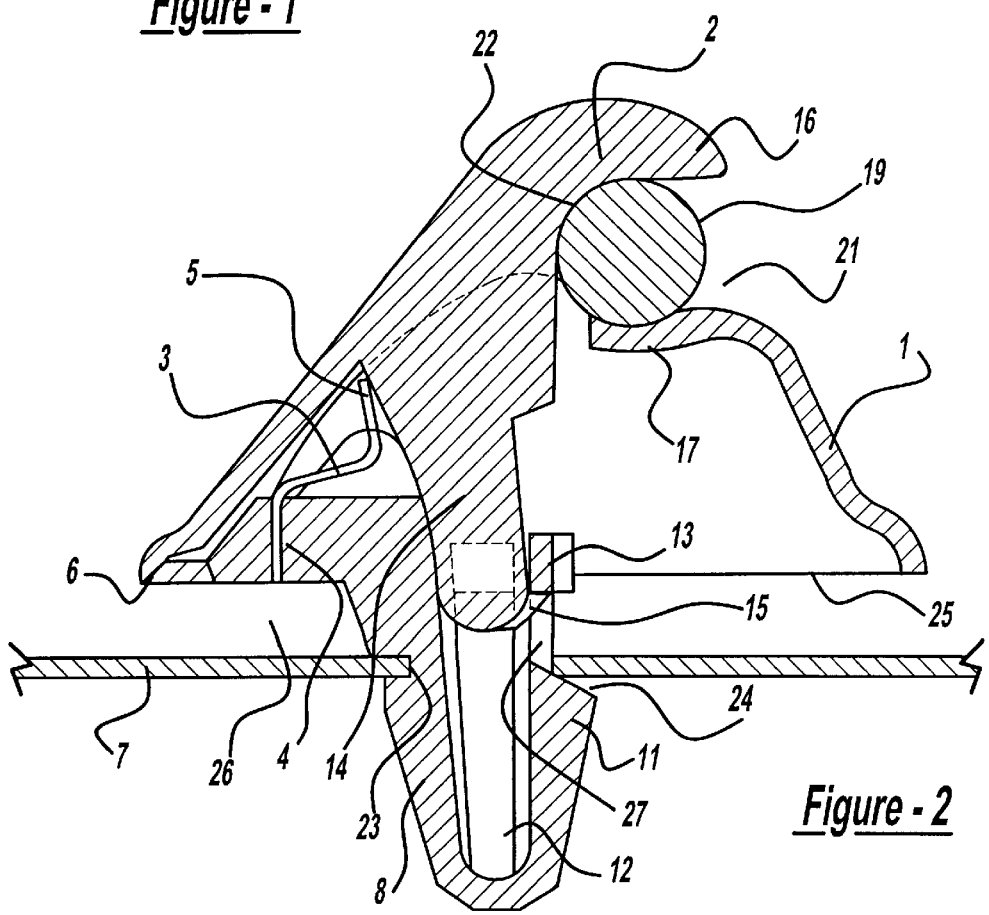
Figure 3:
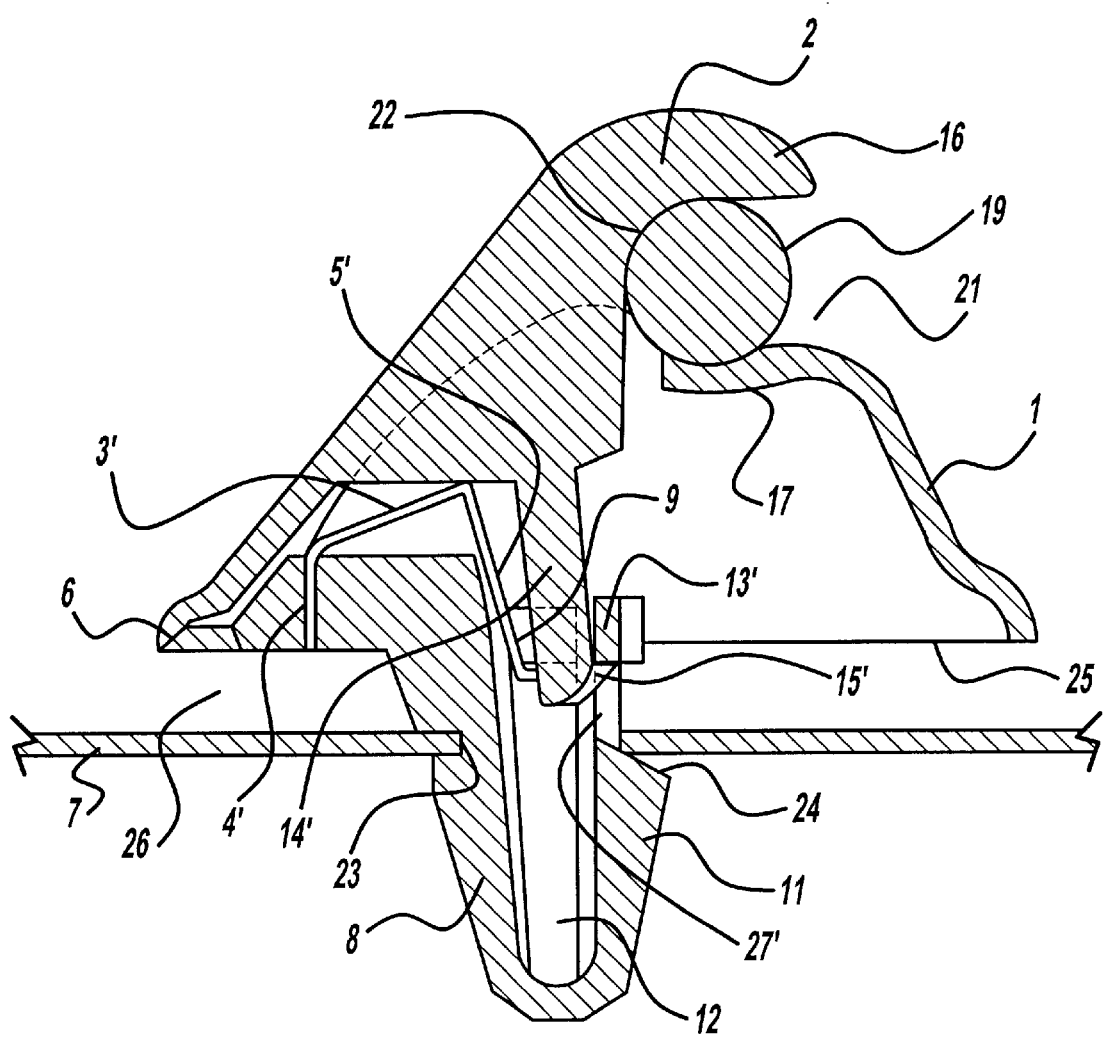
FIG. 3 is a sectional plan view of the small bracket in the mounted state with a snapped-in counter-bearing shaft in accordance with a second embodiment.

An extension 8 is arranged on the base body 1, which is provided with a transverse slit 23, which can be engaged by an edge of an opening in a body sheet metal piece 7 in the manner shown in FIGS. 2 and 3. The base body 1 has an opening 10, into which the complementary body 2 can be flipped along the arrow Y in accordance with the representation in FIGS. 2 and 3. In the process, a projection 14 on the complementary body 2 enters a clearance 9 between the extension 8 and spreading arms 11, 12 connected in one piece with them. In the process a hook 15 in accordance with FIG. 2 snaps into an opening 13 in an extension 27 of the spreading arm 11 and a shoulder 24 extends below the edge of the body opening located opposite the slit 23, so that the small bracket is secured against being pulled out of the body sheet metal piece 7. A space 26, which is filled by an elastic material, for example a headliner, is located between a support surface 27 on the base body 1 and the body sheet metal piece 7.

In the position of use represented in FIGS. 2 and 3, an arm 16 on the complementary body 2, which makes a transition into the actual complementary body 2 via a groove 22, and an arm 17, which is closed by a groove 18 at the base body 1, constitute a bearing opening with an insertion slit 21 for a sun visor shaft 19.

By means of the support of the spring 3 by one leg 4 on the base body 1 and by the other leg 5 on the complementary body 2, it is achieved that, independent of the temperature and without production tolerances being noted in any particular way, the sun visor shaft 19 can be easily inserted into the insertion slit 21 and moved out of it and is seated in the bearing opening without rattling.

FIG. 3 shows another embodiment of the spring 3' and the projection 14'. In the embodiment represented in FIG. 3, the spiral spring 3' is bent twice, wherein the leg 4' is fastened in a slit in the base body 1, the same way as represented in FIG. 2, while the leg 5' projects into the clearance 9 between the projection 14' and the extension 8. The projection 14' is made correspondingly narrower and consists of three parallel legs, the outer two of which have hooks 15', while the center leg does not have a hook. The hooks 15' on the two outer legs extend below a transverse strip 13' arranged on the extension 27. The extension 27 is narrower than the spreading arm 11, so that the hooks 15' can extend behind the transverse strip 13' on both sides of the extension 27'.

Of course, it should be understood that changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

What is claimed is:

1. A small bracket for sun visors of vehicles, the bracket comprising:

two arms for extending around a sun visor shaft in a clamp-like manner, the sides of the arms facing each other constituting an undercut seating opening for the sun visor shaft and an insertion slit, which makes the repeated insertion of the shaft into the opening possible, the first arm being disposed on a base body and the second arm being disposed on a complementary body hingedly connected with the base body, the base body having an opening to receive the complementary body, the complementary body including a projection that enters into a clearance defined within an extension on the base body and is supported by means of a hook arrangement, the extension having spreading arms for fixing the small bracket in place in an opening of the vehicle body, said spreading arms also being used for fixing the complementary body on the base body, and a spring having a first leg and a second leg, the spring being located between the base body and the complementary body, the first leg contacting the base body and the second leg contacting the complementary body proximate the projection.

2. The small bracket in accordance with claim 1, wherein the spreading arm has a shoulder for extending underneath an edge of the opening of the vehicle body and, a narrower extension with a transverse strip proximate the shoulder, and the projection has two hooks that extend underneath the transverse strip on both sides of the extension.

3. The small bracket in accordance with claim 1, wherein the first leg of the spiral spring is fastened in a slit on the base body, and the second leg is bent double and ends in the area of the clearance.

4. The small bracket in accordance with claim 1, wherein the first leg of the spring is proximate the hinged connection, and the second leg is proximate the projection.

5. A small bracket for sun visors of vehicles, the bracket comprising two arms adapted to extend around a sun visor shaft in a clamp-like manner, the sides of the arms opposing each other constituting an undercut seating opening for the sun visor shaft and an insertion slit, which makes the repeated insertion of the latter into the bearing opening possible, wherein the first arm is disposed on a base body and the second arm is disposed on a complementary body connected with the base body via a film hinge, and a spring positioned proximate said film hinge between the base body and the complementary body.

6. A small bracket for sun visors of vehicles, the bracket comprising a base body, a complementary body and a spring, the base body having a first clamp arm, an opening for receiving the complementary body and a fixation extension, the complementary body being connected by a film hinge with the base body and having a second clamp arm opposing said first clamp arm to cooperate as a clamp for said sun visor, said complementary body also having a projection that is received by said opening and disposed within a clearance defined by said fixation extension, and said spring being positioned proximate said film hinge between the base body and the complementary body.

7. The bracket of claim 6 wherein the projection has a hook that engages an opening in the extension.

8. The bracket of claim 7 wherein the spring includes a first leg disposed in a slit in the base body and a second leg disposed in a slit in the base body and a second leg disposed against the complementary body to provide a clamping force at said arms against a sun visor clamped therein.

* * * * *